US007521668B2

(12) United States Patent
Kauppinen

(10) Patent No.: US 7,521,668 B2
(45) Date of Patent: Apr. 21, 2009

(54) OPTICAL AUDIO MICROPHONE ARRANGEMENT INCLUDING A MICHELSON TYPE INTERFEROMETER FOR PROVIDING A PHASE DIFFERENCE BETWEEN DIFFERENT PARTS OF LIGHT BEAMS

(75) Inventor: Ismo Kauppinen, Ilmarinen (FI)

(73) Assignee: Noveltech Solutions Ltd., Turku (FI)

( * ) Notice: Subject to any disclaimer, the term of this patent is extended or adjusted under 35 U.S.C. 154(b) by 0 days.

(21) Appl. No.: 11/724,201

(22) Filed: Mar. 15, 2007

(65) Prior Publication Data

US 2007/0215798 A1 Sep. 20, 2007

(30) Foreign Application Priority Data

Mar. 17, 2006 (FI) .................................. 20060259

(51) Int. Cl.
*G01D 5/34* (2006.01)

(52) U.S. Cl. .................................... 250/231.1; 250/221

(58) Field of Classification Search .............. 250/231.1, 250/229, 221; 356/4.01, 4.07; 367/149, 367/150; 359/149–173

See application file for complete search history.

(56) References Cited

U.S. PATENT DOCUMENTS 1,709,762 A 4/1929 Zworykin
3,387,494 A 6/1968 Golay
3,470,329 A 9/1969 Young
3,842,353 A * 10/1974 Stewart ...................... 324/109
4,160,600 A 7/1979 Luke
4,665,747 A 5/1987 Muscatell
4,926,696 A 5/1990 Haritonidis et al.
4,942,767 A 7/1990 Haritonidis et al.
5,029,023 A 7/1991 Bearden et al.
6,014,239 A * 1/2000 Veligdan ..................... 398/134
2004/0071383 A1 4/2004 Balachandran et al.

FOREIGN PATENT DOCUMENTS

GB 1267632 3/1972
WO WO 03/049494 A1 6/2003
WO WO 2004/029594 A1 4/2004

OTHER PUBLICATIONS

Search Report issued by the Finnish Patent Office in priority Finnish Application No. 20060259, Feb. 5, 2007.

* cited by examiner

*Primary Examiner*—Que T Le
(74) *Attorney, Agent, or Firm*—Buchanan Ingersoll & Rooney PC

(57) ABSTRACT

This invention relates to an optical audio microphone arrangement comprising at least a sensor arranged to be movable in response to sound waves and a Michelson type interferometer for measuring the displacement of the sensor, which comprises a reflecting surface. The interferometer comprises at least a light source, a reference mirror, a beam splitter and at least two detectors. This invention relates further to a method for measuring sound waves.

21 Claims, 2 Drawing Sheets

OPTICAL AUDIO MICROPHONE ARRANGEMENT INCLUDING A MICHELSON TYPE INTERFEROMETER FOR PROVIDING A PHASE DIFFERENCE BETWEEN DIFFERENT PARTS OF LIGHT BEAMS

FIELD OF THE INVENTION

This invention relates to an optical audio microphone arrangement comprising at least a sensor arranged to be movable in response to sound waves and a Michelson type interferometer for measuring the displacement of the sensor, which comprises a reflecting surface. The interferometer comprises at least a light source, a reference mirror, a beam splitter and at least two detectors. This invention relates further to a method for measuring sound waves.

BACKGROUND OF THE INVENTION

Microphones have been widely used e.g. in sound recording, in applications of speech and music recording, in sound level measurements, and in environmental noise level measurements.

In sound wave measurements, e.g. sound recording, it is important to measure the sound waves with high sensitivity and in great detail i.e. with a large dynamic range and linear response. Also, it is important that the response of the microphone does not change in temperature and humidity variations.

A typical microphone is a transducer, which converts acoustic energy to electrical energy. Typically the fluctuating acoustic energy vibrates a diaphragm and the displacement of the diaphragm is converted to an electrical signal proportional to the acoustic energy. Various types of microphones are known, which vary in the accuracy and sensitivity of detecting the original acoustic energy.

Typically high quality audio microphones use a capacitive measurement principle. The drawback of the capacitive measurement principle is that high sensitivity is gained only by bringing the back plate (electrode) close to the diaphragm (electrode). This creates damping of the system and lowers the Q-value of the diaphragm increasing the self noise, which is created by the Brownian motion. In addition the existence of the back plate creates extra non-linearity.

Furthermore, a typical drawback of capacitive microphones is that the dynamic range is related to the sensitivity. For example capacitive microphones with a wide dynamic range have poor sensitivity and microphones with better sensitivity usually have a narrow dynamic range.

In order to achieve a microphone with high sensitivity and a wide dynamic range simultaneously the displacement of the sensor should be measured optically without disturbing the sensor movement and directly in a digital form.

Patent publication GB 1267632 discloses a digital optical microphone, particularly for a telephone handset, that includes an interferometer consisting of a two-prism block and a mirror attached to the microphone diaphragm. Infrared radiation from a diode is reflected off the moving mirror and the back face of the block, interferes and is detected by photodiodes. The two photoelectric signals are in phase quadrature due to the different thicknesses of reflecting coating on the mirror, which reflect light to the photodiodes respectively. The two signals may be delta-modulated by a logic circuit, which may additionally include a winding, providing a biasing force on the diaphragm, which receives an integrated value of the two photoelectric signals.

With the microphone according to GB 1267632 diaphragm displacements no smaller than $\lambda/4$, where $\lambda$ is the wave length of the light source in the interferometer, can be measured, which is not a good accuracy. The focuses of the light beams are in infinity in relation to the mirrors and therefore the stability of the system is easily disturbed by inclination of the diaphragm and the mirror attached to it and the reference mirror.

OBJECTS OF THE INVENTION

An object of the invention is to eliminate or alleviate at least some of the above-mentioned problems of the prior art.

Another object of the invention is to provide an optical audio microphone arrangement with simultaneously high sensitivity and a wide dynamic range.

DESCRIPTION OF THE INVENTION

A typical optical audio microphone arrangement according to the invention comprises at least

- a sensor, arranged to be movable in response to sound waves and comprising a reflecting surface,
- a Michelson type interferometer for measuring the displacement of the sensor, comprising at least,
  - a light source for generating a light beam,
  - a reference mirror,
  - a beam splitter for splitting the light beam from the light source for the sensor and for the reference mirror and for splitting the light beams reflected from the sensor and from the reference mirror for detectors,
  - at least two detectors arranged to receive light beams coming from the sensor and from the reference mirror via the beam splitter and arranged to convert the received light beams into electric signals.

A typical optical audio microphone arrangement according to the invention further comprises means for focusing the light beam coming from the light source and split by the beam splitter essentially on the surface of both the sensor and the reference mirror.

As known, the light beams coming to the detectors are interferences of the light beams coming from the sensor and from the reference mirror. According to an embodiment of the invention at least three detectors or at least four detectors are arranged to receive light beams coming from the sensor and from the reference mirror via the beam splitter and arranged to convert the received light beams into electric signals.

In this application, by focusing the light beam essentially on the surface of the sensor and the reference mirror, it is meant that the focus is closer than 2 cm from the surface of the sensor and the reference mirror. The focus can be on either side of the surface, on the front side or backside. According to a preferred embodiment the focus is arranged closer than 0.5 mm from the surface and according to a preferred embodiment of the invention the focus is arranged closer than 0.1 mm from the surface of the sensor and the reference mirror. By the surface of the sensor is meant the reflecting surface of the sensor.

When the focuses are essentially on the surface of the sensor and surface of the reference mirror the small tiltings of these surfaces do not affect the measuring result. The closer to the surfaces the focuses are the greater tilting can be allowed. For example a laser can be focused on these surfaces almost in a dot-like manner, i.e. closer than 0.1 mm from the surface, and thereby the measuring result is not affected by tilting or inclination of the sensor or the reference mirror.

In this application a mirror means a conventional mirror or any other reflecting means suitable for the purpose. In this invention the sensor comprising a reflecting surface corresponds to a moving mirror of a typical Michelson interferometer. The reference mirror corresponds to a fixed mirror of a typical Michelson interferometer. According to an embodiment of the invention also the reference mirror can be arranged to be movable, e.g. in order to tilt it.

The beam splitter can be a two-prism block, a semi-transparent mirror or any other means suitable for the purpose. Splitting of a beam by the beam splitter means that one part of the beam is passing through it and one part is reflected from it.

According to a preferred embodiment of the invention the microphone arrangement comprises a housing. Typically some or most of the components comprised in the microphone arrangement according to the invention are arranged at least essentially inside the housing. However, e.g. an analog-to-digital converter and/or means for digital signal processing can be arranged apart from the housing e.g. in a microphone pre-amplifier.

According to a preferred embodiment of the invention the light source is arranged to generate a laser beam. According to another embodiment the light source is a light emitting diode (LED). According to yet another embodiment a filament lamp is used.

According to a preferred embodiment of the invention the means for focusing the light beam comprise at least one optical lens arranged on the path of the light beam.

According to an embodiment of the invention means for focusing can be arranged in connection with the light source.

According to an embodiment of the invention the interferometer comprises, in addition to the beam splitter, means for providing a phase difference between different parts of the light beams. This means can e.g. be an element in which the speed of the light is different than in open air. A beam splitter provides a phase difference so that from the beam splitter out coming beams have a phase difference of 180°.

According to an embodiment of the invention the means for providing a phase difference is at least partly transparent element. It can e.g. be a transparent panel or plate.

According to a preferred embodiment of the invention, the means for providing phase difference comprise a glass panel, which is arranged to be movable, e.g. rotatable. It can also be a plastic panel or any other means suitable for the purpose.

According to an embodiment of the invention the glass panel or any other means for providing the phase difference is positioned so that one part of the beam goes through it and the other part passes by it whereby the phase difference is achieved.

Preferably the means for providing a phase difference is located between the beam splitter and the reference mirror. It can also be located between the beam splitter and the sensor. Either a part of the beam going to or a part of the beam coming from the reference mirror or the sensor can be phase shifted with the means for providing a phase difference.

Preferably the position of the means for providing the phase difference is adjusted in such a way that as the sensor moves it produces at least two modulated light beams with an optimal 90° phase difference relative to each other. The modulated light beams are measured using at least two detectors, e.g. photodiodes. Also other phase differences can be utilized, e.g. 88-92°, 85-95° or 80-100°.

According to an embodiment of the invention the phase difference is achieved by tilting the reference mirror.

According to an embodiment of the invention the travelling path of a light beam can be provided with two elements, e.g. two glass panels, of which at least one having its position adjustable. It is possible, by adjusting the position of said elements, to provide e.g. a 90° phase difference between different parts of the light beam.

According to a preferred embodiment of the invention the interferometer comprises three detectors arranged to receive three beams with a phase difference relative to each other. Preferably three beams with a phase difference of 90° relative to each other are provided. Intensity changes and fluctuations of the light source can be compensated in the output signal when three beams with a phase difference are used.

According to another preferred embodiment of the invention the interferometer comprises four detectors arranged to receive four beams with a phase difference relative to each other. Preferably four beams with a phase difference of 90° relative to each other are provided. All of the light energy from the light source can be utilized when four detectors are used. Also the intensity changes and fluctuations of the light source can be compensated when four detectors are used.

According to an embodiment of the invention the interferometer comprises at least three or at least four detectors arranged to receive beams with a phase difference relative to each other.

According to an embodiment of the invention the interferometer comprises an array of detectors comprising more than four, preferably more than ten, more preferably more than one hundred detectors. According to an embodiment of the invention the array of detectors comprises more than one thousand, e.g. 1024 detectors. According to an embodiment of the invention the interferometer comprises an array of detectors comprising more than three detectors.

According to a preferred embodiment of the invention the sensor arranged to be movable in response to sound waves is a pressure sensor. According to an embodiment of the invention the sensor is a diaphragm. According to an embodiment the sensor is a tape.

According to an embodiment of the invention the sensor is a cantilever. The cantilever can e.g. be a door-like element with frames according to the European patent publication EP 1546684.

According to an embodiment of the invention the interferometer is adjusted in such a way that the light source is set relative to the beam splitter at an angle other than a 45-degree angle. Thereby the light beam reflecting from both the sensor and from the reference mirror, the focus of which beam is essentially on the sensor and on the reference mirror, does not return along precisely the same path, but, instead, there is a small angle between the outbound light beam and inbound light beam.

By the mentioned angle it is meant the angle between the line of the beam from the light source and the plane of the beam splitter.

According to an embodiment of the invention the angle between the light source and the beam splitter is 45°. According to another embodiment the angle is 40-50°, and according to yet another embodiment the angle is 20-70°.

According to an embodiment of the invention the microphone comprises an analog-to-digital converter for converting the analog electrical signals from the detectors into digital signals.

According to another embodiment of the invention the microphone also comprises means for processing the digital signal. Digital signal processing is used to produce a digital output signal that is proportional to the displacement of the sensor.

One benefit of the microphone according to the invention is that it is sensitive and it has a wide dynamic range. With the microphone according to the present invention sensitivity and dynamic range are independent of each other. The dynamic range with the microphone according to the present invention is considerably wider than the range audible to the human ear.

According to the invention the movement and position of the sensor is measured continuously and the resolution is only limited by the electronic noise. At its best the resolution of 0.01 picometers can be achieved with the optical measurement system.

Advantages gained by an interferometer-based measurement according to the present invention further include highly linear response.

DETAILED DESCRIPTION OF THE DRAWINGS

Figure 1:
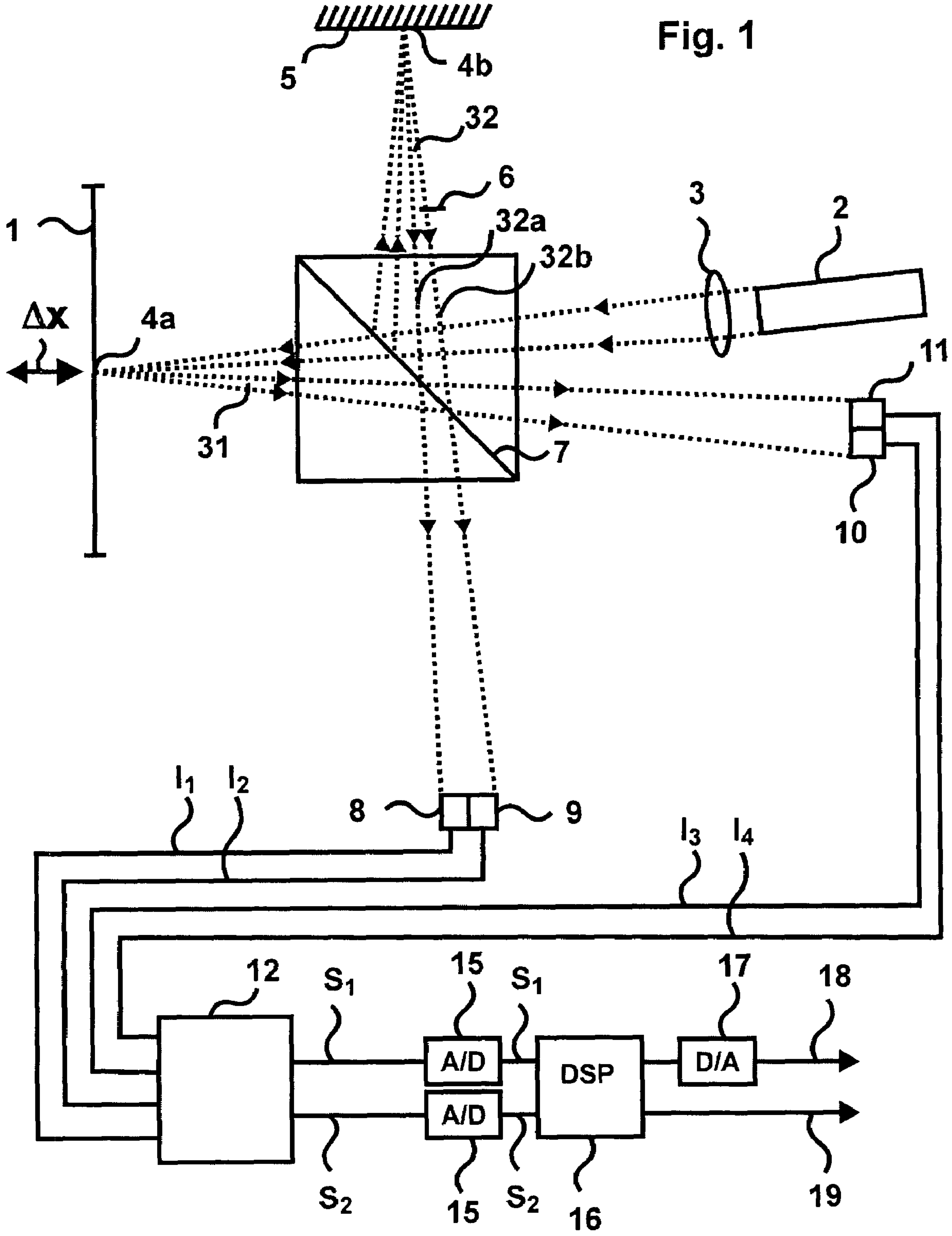
FIG. 1 shows schematically an optical audio microphone arrangement according to a first embodiment of the invention.

FIG. 1 shows schematically an optical audio microphone arrangement according to a first embodiment of the invention. The microphone comprises a sensor 1, which is arranged to be movable in response to sound waves. The sensor 1 is a membrane with a reflecting surface. The sensor functions as a moving mirror in a Michelson type interferometer arrangement, which is used for measuring the displacement Δx of the sensor. In this embodiment the light source 2 is set relative to the plane of a beam splitter 7 at an angle of about 50-55°. The light beams reflecting from both the sensor 1 and from the reference mirror 5 do not return along precisely the same path, but, instead, there is a small angle between the outbound light beam and inbound light beam. An optical lens 3 arranged between the light source 2 and the beam splitter 7 is used for focusing the light beam 4*a*, 4*b* on the surface of the sensor 1 and the reference mirror 5.

In the embodiment of FIG. 1, two detectors 8, 9, which constitute a double detector, are adapted to measure the interference of light beam 31 returning from the sensor 1 and reflected from the beam splitter 7, and light beam 32 returning from the reference mirror 5 and passing through the beam splitter. Two more detectors 10, 11, which are preferably placed in the proximity of the light source 2, are adapted to measure the light beam 31 returning from the sensor 1 and passing through the beam splitter 7, and the light beam 32 reflected from the reference mirror 5 and the beam splitter 7.

A glass panel 6 is located between the reference mirror 5 and the beam splitter 7 so that one part of the beam 32 reflected from the reference mirror goes through the glass panel 6 and the other part passes it. The glass panel can be adjusted, e.g. rotated so that a phase difference between the two parts of the beam is achieved. The phase difference can be adjusted by adjusting the glass panel 6.

The electric signals from the detectors 8, 9, 10, 11 are given by $$I_1=B(1+\cos\phi)$$

$$I_2=B(1+\sin\phi)$$

$$I_3=B(1-\sin\phi)$$

$$I_4=B(1-\cos\phi)$$

where B is the laser intensity and $\phi=4\pi\Delta x/\lambda$.

These electric signals are processed in the analog form in analog electronics 12 to form two signals $S_1$ and $S_2$ given by $$S_1=I_2-I_3=2B\sin\phi$$

$$S_2=I_1-I_4=2B\cos\phi$$

Then the analog signals $S_1$ and $S_2$ are converted to digital signals with A/D converters 15. The digital signals $S_1$ and $S_2$ are further digitally processed with a means for DSP 16 in order to obtain the output signal 19 proportional to the displacement of the sensor:

$$\Delta x=(\lambda/4\pi)\arctan(S_1/S_2)$$

In case an analog output signal 18 is needed a D/A converter 17 can be used.

Figure 2:
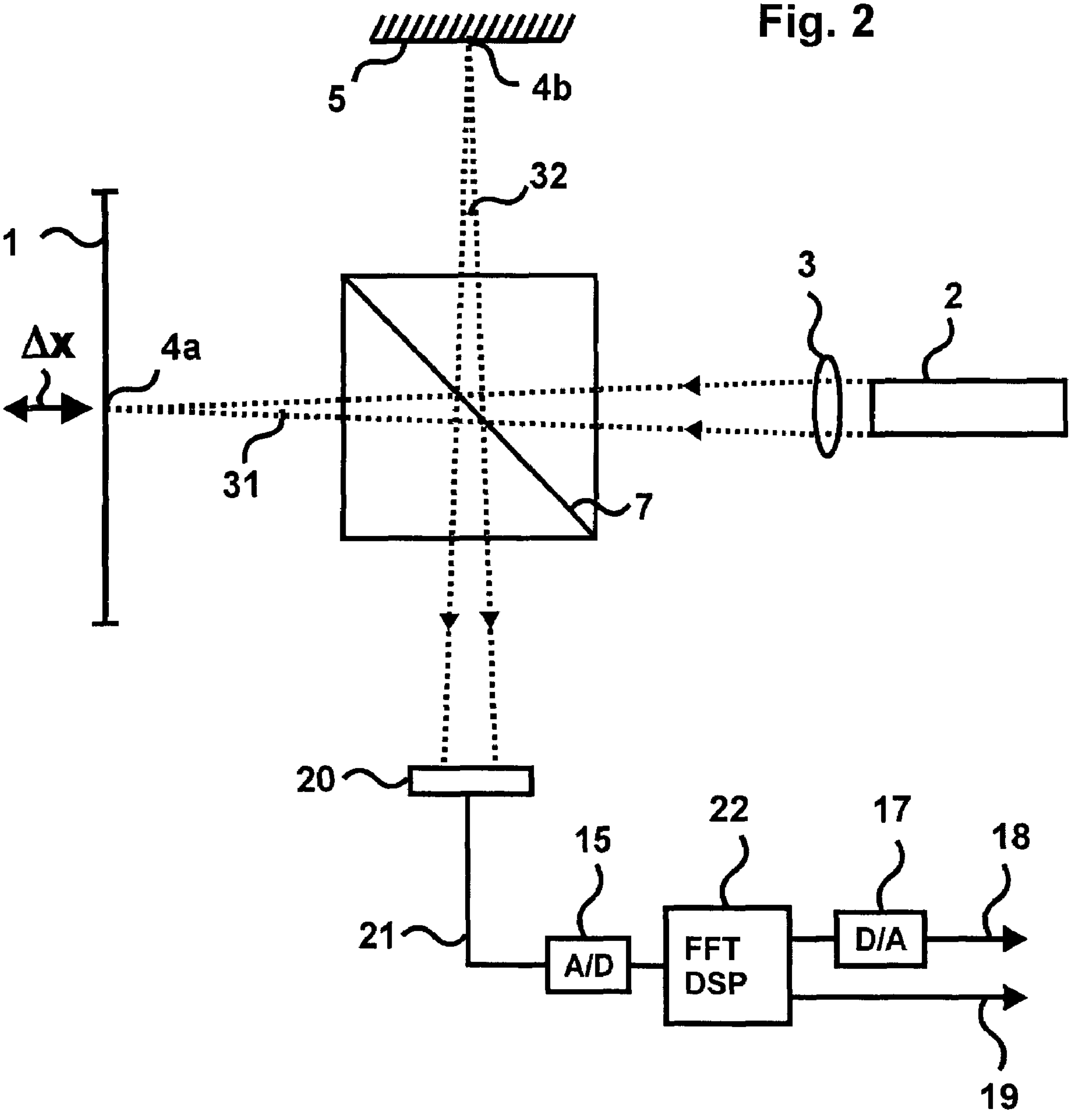
FIG. 2 shows schematically an optical audio microphone arrangement according to a second embodiment of the invention.

FIG. 2 shows schematically an optical audio microphone arrangement according to a second embodiment of the invention. In this embodiment a light source 2 is set relative to a plane of a beam splitter 7 at an angle of about 45°. An optical lens 3 is used for focusing parts 4*a*, 4*b* of a light beam near to a surface of a sensor 1 and a reference mirror 5. An array of detectors 20 comprising hundreds of detectors is arranged to measure the interference of the light beam 31 returning from the sensor 1 and reflected from the beam splitter 7, and light beam 32 returning from the reference mirror 5 and passing through the beam splitter. The reference mirror 5 can be adjusted, e.g. tilted so that a phase difference between different parts of the beam 32 is achieved.

The image signal 21 from the array of detectors is converted to a digital form using an analog-to-digital converter 15. The digital image signal is then further processed in a digital signal processor 22. The Fourier transform is applied to the digital image signal in order to achieve amplitude and phase spectra. The digital output signal 19 proportional to the sensor displacement is formed by using the phase value in the phase spectrum corresponding to the maximum amplitude value in the amplitude spectrum. In case an analog output signal 18 is needed a D/A converter 17 can be used.

There is no intention to limit the invention to the foregoing embodiments, but it can be varied within the scope of the inventive concept set forth in the claims.

The invention claimed is:

1. An optical audio microphone arrangement, comprising at least

- a sensor, arranged to be movable in response to sound waves and comprising a reflecting surface,
- a Michelson type interferometer for measuring the displacement of the sensor, comprising at least,
  - a light source for generating a light beam,
  - a reference mirror,
  - a beam splitter for splitting the light beam from the light source for the sensor and for the reference mirror and for splitting the light beams reflected from the sensor and from the reference mirror,
  - means for providing a phase difference between different parts of the light beams, and
  - a group of at least two detectors arranged to receive light beams with a phase difference relative to each other, the light beams coming from the sensor and from the reference mirror via the beam splitter, the group of at least two detectors arranged to convert the received light beams into electric signals, wherein the microphone further comprises means for focusing the light beam coming from the light source and split by the beam splitter essentially on the surface of both the sensor and the reference mirror.

2. An optical audio microphone arrangement according to claim 1, wherein the light source is arranged to generate a laser beam.

3. An optical audio microphone arrangement according to claim 1, wherein the means for providing phase difference comprise a transparent panel, which is arranged to be movable.

4. An optical audio microphone arrangement according to claim 1, wherein the means for providing a phase difference is located between the beam splitter and the reference mirror and/or between the beam splitter and the sensor.

5. An optical audio microphone arrangement according to claim 1, wherein the means for providing a phase difference is the reference mirror which can be arranged to be tilted.

6. An optical audio microphone arrangement according to claim 1, wherein the interferometer comprises three detectors arranged to receive three beams with a phase difference relative to each other.

7. An optical audio microphone arrangement according to claim 1, wherein the interferometer comprises four detectors arranged to receive four beams with a phase difference relative to each other.

8. An optical audio microphone arrangement according to claim 1, wherein the interferometer comprises an array of detectors comprising more than four detectors.

9. An optical audio microphone arrangement according to claim 1, wherein the sensor is a diaphragm.

10. An optical audio microphone arrangement according to claim 1, wherein the sensor is a cantilever.

11. An optical audio microphone arrangement according to claim 1, wherein the out coming beam of the light source is located at an angle of 20-70 degrees in relation to a plane of the beam splitter.

12. An optical audio microphone arrangement according to claim 1, wherein the arrangement further comprises an analog-to-digital converter for converting the analog electrical signals from the detectors into digital signals.

13. An optical audio microphone arrangement according to claim 12, further comprising means for processing the digital signal.

14. A method for measuring sound waves, comprising:

arranging a sensor comprising a reflecting surface, to be movable in response to sound waves, measuring displacement of the sensor with a Michelson type interferometer, the measuring comprising:

generating a light beam by a light source, splitting the light beam for the sensor and a reference mirror by a beam splitter and reflecting the split beams from the sensor and the reference mirror back to the beam splitter, and further to a group of at least two detectors, providing a phase difference between different parts of the light beams, receiving the light beams coming from the sensor and the reference mirror via the beam splitter, and converting the received light beams into electric signals by the detectors, and focusing the light beam coming from the light sources and split by the beam splitter essentially on the surface of both the sensor and the reference mirror.

15. A method according to claim 14, wherein the light beam generated by the light source is a laser beam.

16. A method according to claim 14, wherein a transparent panel arranged to be movable is used for providing the phase difference.

17. A method according to claim 14, wherein three beams with a phase difference relative to each other are provided and measured by three detectors.

18. A method according to claim 14, wherein four beams with a phase difference relative to each other are provided and measured by four detectors.

19. A method according to claim 14, wherein the phase difference provided between the light beams is essentially 90 degrees.

20. An optical audio microphone arrangement according to claim 8, wherein the array of detectors comprises more than ten detectors.

21. An optical audio microphone arrangement according to claim 8, wherein the array of detectors comprises more than one hundred detectors.

* * * * *